Patented June 30, 1936

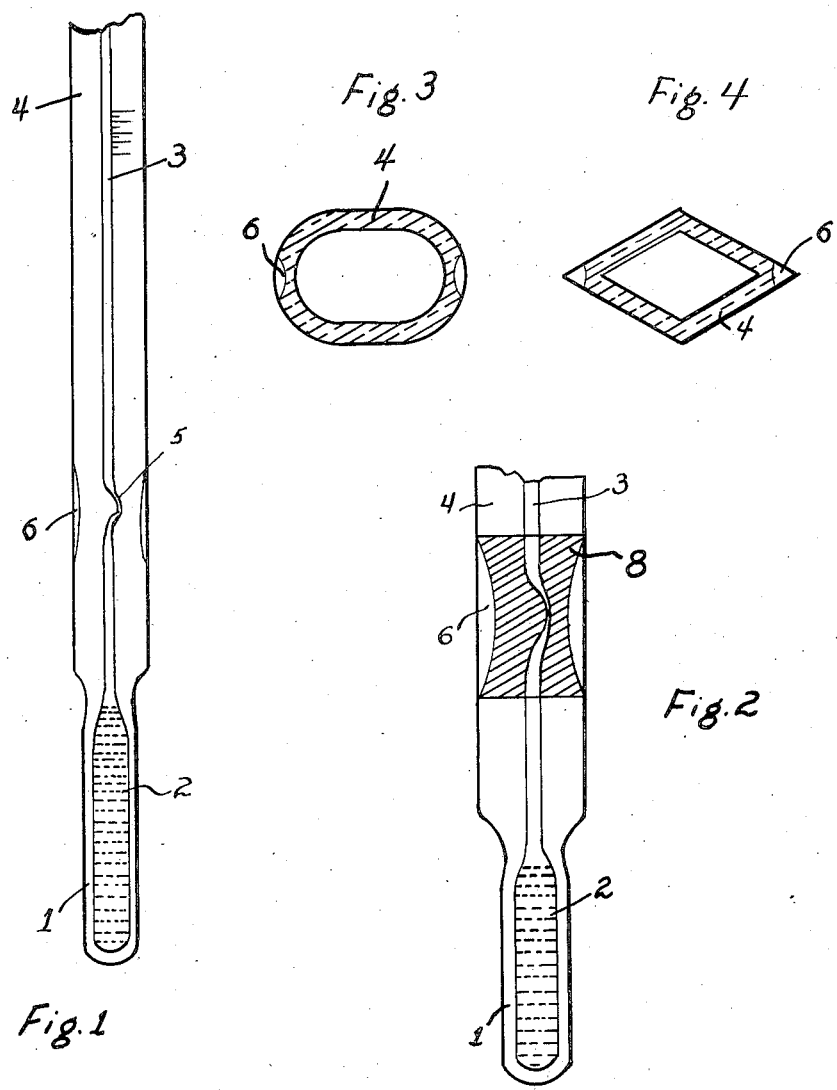

2,045,693

UNITED STATES PATENT OFFICE 2,045,693

THERMOMETER

Simon Broder, Washington, D. C.

Application March 1, 1935, Serial No. 8,919

2 Claims. (Cl. 73—52)

Maximum thermometers are ordinarily made of glass and have a capillary bore in which the mercury or other indicating fluid rises during increasing temperature. A constriction in the bore prevents return of the indicating fluid, and the instrument must be whipped to bring centrifugal action or inertia into play to drive down the fluid, in order to permit another reading.

Attempts have been made, as in Hicks Patent 460,013, Simpson Patent 631,095, Zeal Patent 695,262, Jones Patent 1,693,299, and others, to provide means for returning the indicating fluid to position, but each of these methods involves complicated structure, unwieldy devices, or other defects to safe, inexpensive operation.

Whipping the thermometer may force the liquid into the bottom of the bulb at such pressure as to crack the glass. In any event, it is unsafe and time-consuming. Mechanical pushing means may also crack the glass, destroy the vacuum, or introduce impurities. My improved construction avoids all these disadvantages and provides a simple and inexpensive means for restoring the fluid to the bulb by the simplest of manipulations.

My invention has particular reference to fever or clinical thermometers using mercury, although it is understood that other measuring instruments are contemplated and that alcohol or other fluid may be used as well as mercury.

Fig. 1 is an elevation of a clinical thermometer showing in general the application of my invention.

Fig. 2 is a partial elevation of another form of my invention.

Fig. 3 is a schematic cross-section through a thermometer of my invention at the point of constriction.

Fig. 4 is a view similar to Fig. 3, but showing a modification.

Referring to Fig. 1, I construct my thermometer in the usual fashion, providing a bulb 1 to contain most of the mercury 2. The capillary bore 3 in the stem 4 permits the mercury 2 to rise in the presence of heat, and the temperature is shown by means of proper indicia marked on the glass. A constriction 5 in the capillary bore 3 permits the mercury to rise only with difficulty, and prevents return of the liquid metal to the bulb 1 until the thermometer is shaken or otherwise manipulated, as previously described.

In my invention, however, I construct the glass of the thermometer so that there is a slight flexibility of the glass at the point of constriction 5. All glass has some degree of elasticity, which is the property of a material to return to its original dimension after being deformed within its elastic limit. Furthermore, many kinds of glass have some degree of flexibility, which is the property of a material to bend under stress without rupturing. Both these properties are largely dependent on the constituents of the glass, such as calcium oxide, borosilicate, and others. I have found that by making the walls of the glass stem 4 of the proper thickness at the point of constriction, I can manually squeeze the glass to change the shape of the constriction to permit an easy return of the mercury 2 to the bulb 1. As shown in Fig. 1, I mold or cut away the glass at 6 to provide finger rests and to permit flexibility of the glass at this point. Of course, the glass is not so thin as to render it unusually liable to breakage, and is strong enough to permit the very small deflection of the glass necessary to change the shape of the constriction.

The constriction, as shown in cross-section in Fig. 3, may have the shape of an ellipse. Consequently, pressure at 6 will deform the elliptical cross-section into a more circular shape; this, of course, will provide a greater area for the mercury to traverse, and the respective area will be such as to prevent downward flow in the one case and permit such flow in the other. The difference in area is very small, as may be ascertained from the dimensions of the capillary bore itself.

Various other shapes may be given the constriction, as shown for example in Fig. 4, where it has the shape of a diamond. Pressure at 6 will compress this into a more square shape, again increasing the area through which the mercury may flow. Other shapes may be chosen, these being merely illustrative.

If desired, the portion of the stem of the thermometer at the point of constriction and for some small distance above and below, may be of metal or rubber which fuses with the glass. A modification using metal is shown in Fig. 2. The metal 8 will be stronger and more flexible than some forms of glass. To avoid interference with proper operation of the thermometer, the metal 8 should not extend to the bulb 1 or to the indicia. Of course, each instrument must be properly calibrated.

In my device, therefore, the mercury being initially in position in the bulb 1, the thermometer is ready for a reading, during which the mercury expands and flows above the constriction 5. To restore the mercury to the bulb 1 preparatory to another reading, the glass at 6 or metal at 8 is gently pressed between the thumb and forefinger; the pressure is such as to make the crosssectional area at the point of constriction more nearly circular. A circular area is the largest for a given perimeter, and the dimensions are so chosen that the increase in area will permit the mercury to flow through the constriction back to the bulb 1.

The shape of the thermometer may vary. It may be triangular or round in cross-section, may have various shapes for the bore, may have reflecting or colored or magnifying media to more readily show the mercury, and may have such other changes as occur to one skilled in the art, the forms shown herein being merely illustrative and not limitative.

I claim:

1. A measuring device comprising a body having a bore and a constriction normally non-circular in cross-section in the bore, the material of the device at the point of constriction being such to permit deformation of the cross-section of the constriction.

2. The device set forth in claim 1, wherein the outer portion of the device at the constriction is provided with a finger rest for permitting pressure to be applied to deform the cross-section of the constriction.

SIMON BRODER.